(12) United States Patent
Buscema

(10) Patent No.: US 8,326,047 B2
(45) Date of Patent: Dec. 4, 2012

(54) IMAGE PROCESSING USING NEURAL NETWORK

(75) Inventor: Paolo Massimo Buscema, Rome (IT)

(73) Assignee: Bracco Imaging S.p.A., Milan (IT)

( * ) Notice: Subject to any disclaimer, the term of this patent is extended or adjusted under 35 U.S.C. 154(b) by 401 days.

(21) Appl. No.: 12/664,210

(22) PCT Filed: Jul. 2, 2008

(86) PCT No.: PCT/EP2008/058501
§ 371 (c)(1),
(2), (4) Date: Feb. 17, 2010

(87) PCT Pub. No.: WO2009/007285
PCT Pub. Date: Jan. 15, 2009

(65) Prior Publication Data
US 2010/0135574 A1    Jun. 3, 2010

(30) Foreign Application Priority Data

Jul. 6, 2007    (EP) .................................... 07425419

(51) Int. Cl.
*G06K 9/56* (2006.01)
(52) U.S. Cl. ........ 382/205; 382/190; 382/159; 382/156; 382/224; 706/20; 706/48; 706/924
(58) Field of Classification Search .................. 382/205, 382/190, 159, 156, 224; 706/20, 48, 924
See application file for complete search history.

(56) References Cited

U.S. PATENT DOCUMENTS
2007/0233624 A1    10/2007    Buscema

OTHER PUBLICATIONS

Kurugollu et al: "Image segmentation by relaxation using constraint satisfaction neural network", Image and Vision Computing, 20, pp. 483-497, 2002.*
Arena et al: "Image processing for medical diagnosis using CNN", Nuclear Instruments and Methods in Physics Research, 497 pp. 174-178, 2003.*
Chua, L. O. at al., Cellular neural networks: Applications, IEEE Transactions on Circuits and Systems, IEEE Inc., New York, NY, vol. 35, No. 10, Oct. 1, 1988, pp. 1273-1290, XP000119052, Section III.
PCT, International Search Report, Dec. 11, 2008.

* cited by examiner

*Primary Examiner* — Matthew Bella
*Assistant Examiner* — Ruiping Li
(74) *Attorney, Agent, or Firm* — Themis Law

(57) ABSTRACT

Image processing method that includes the steps of considering each image point as a node of an artificial neural network, and of processing the image as function of values of the nodes and of connections of each image point undergoing processing with neighboring image points, the image points of the processed image being obtained by iterative evolution steps of parameters defining the appearance as evolution steps of the value of nodes or by iterative evolution steps of values of the set of connections or by a combination of the evolutions, wherein the processing occurs by evolution iterative steps that are functions of connections of neighboring image points with the image point under examination, each of the neighboring image points being further considered as neighboring one or more or all adjacent image points, the functions providing immediate feedback contributions for determining appearance values of all other image points.

12 Claims, 13 Drawing Sheets

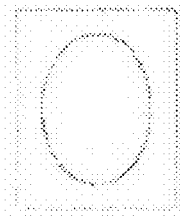
Fig. 7
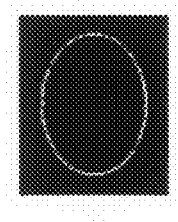
Fig. 6
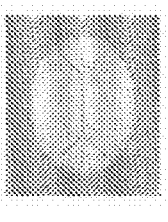
Fig. 8
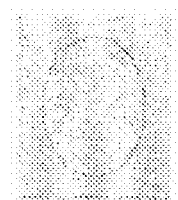
Fig. 5
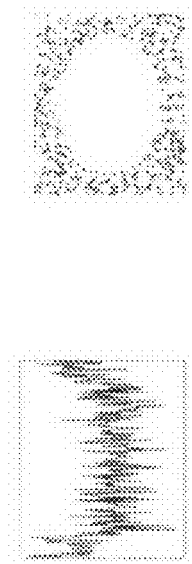
Fig. 4
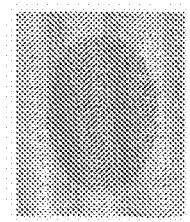
Fig. 3
Fig. 2

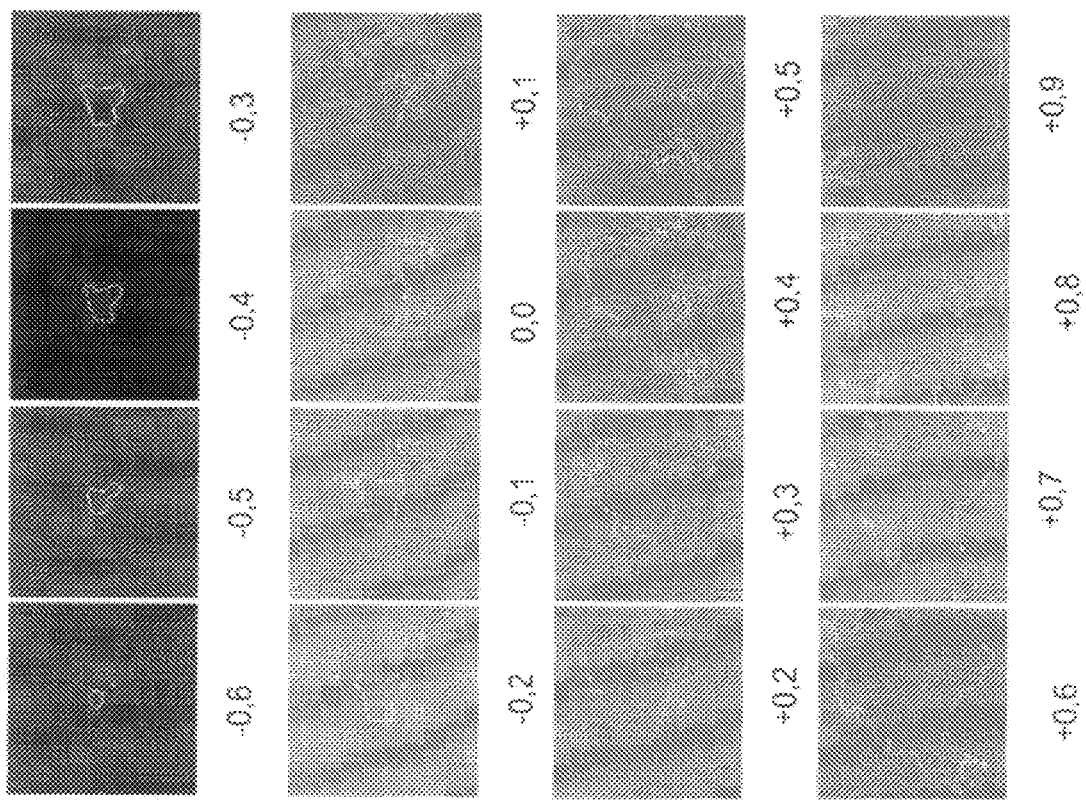

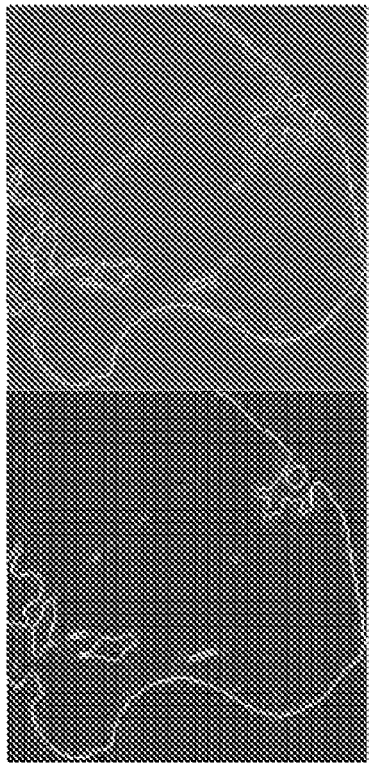
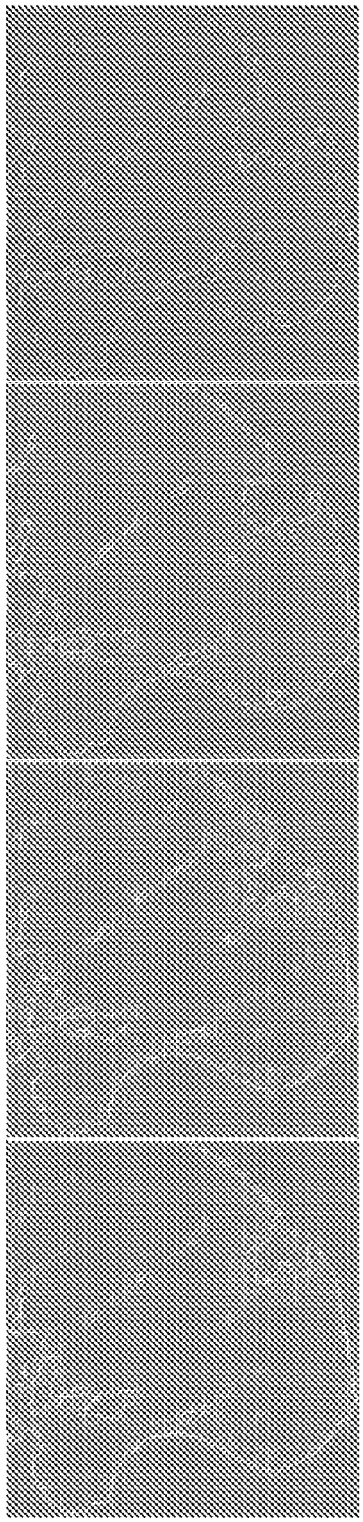
Fig. 15a1; 0,0
Fig. 15a2; 0,1
Fig. 15a3; 0,2
Fig. 15a4; 0,3
Fig. 15a5; 0,4
Fig. 15a6; 0,5

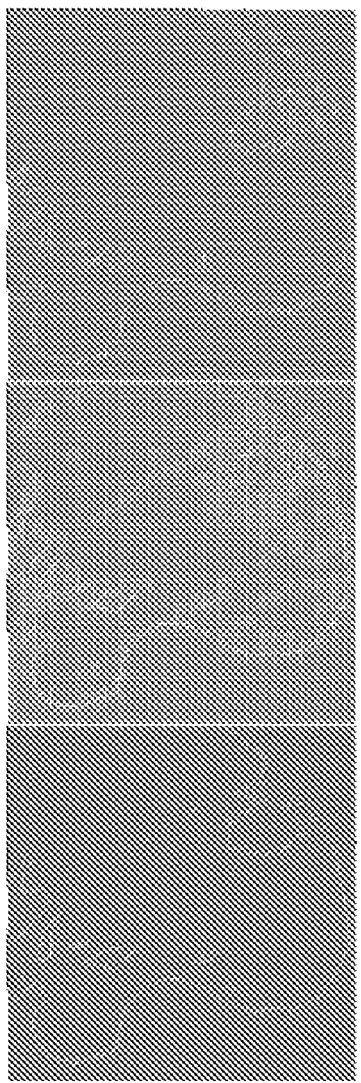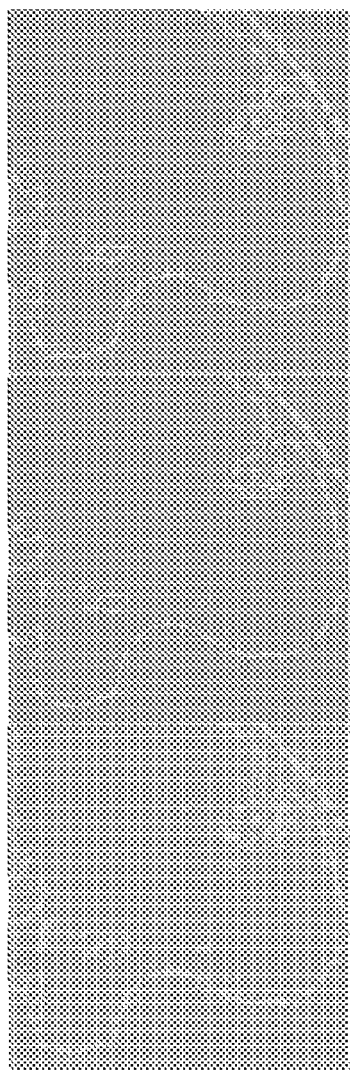
Fig. 15b1; 0,0  Fig. 15b2; -0,1  Fig. 15b3; -0,2  Fig. 15b4; -0,3  Fig. 15b5; -0,4  Fig. 15b6; -0,5

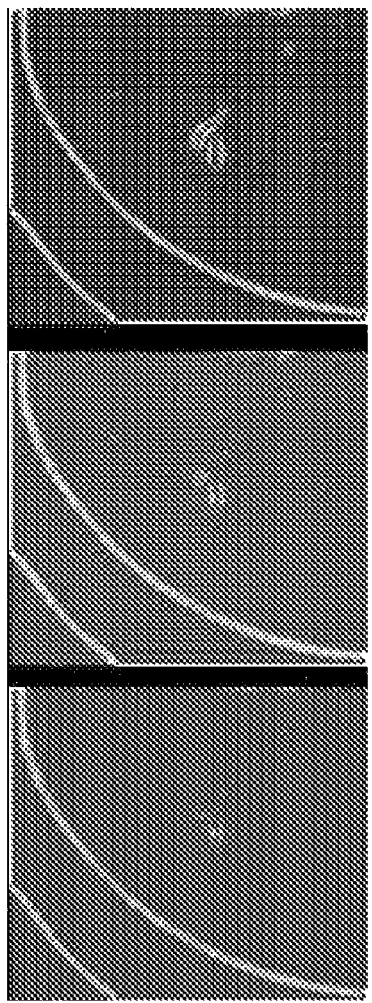
Fig. 16a3; 0,2
Fig. 16a2; 0,1
Fig. 16a1; 0,0
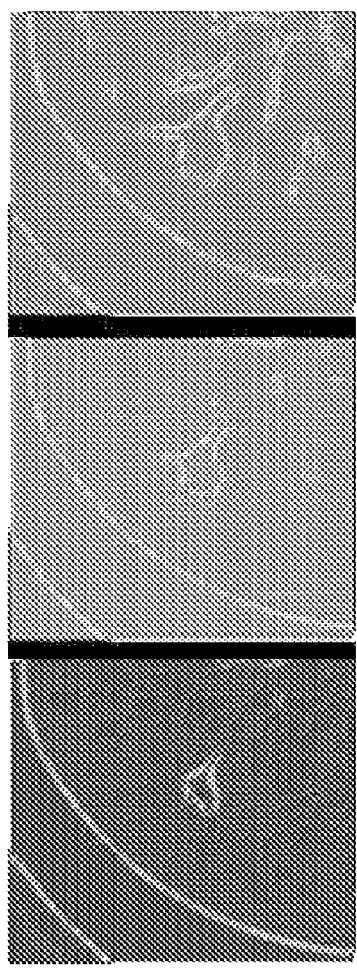
Fig. 16a6; 0,5
Fig. 16a5; 0,4
Fig. 16a4; 0,3

IMAGE PROCESSING USING NEURAL NETWORK

FIELD OF THE INVENTION

The invention relates to an image processing method wherein each image is composed of an array of image points, so called pixels or voxels, particularly in a two-, three-, or more dimensional space respectively, each image point being univocally defined by its position within the array of image points and by one or more numerical parameters defining the image point appearance as regards characteristics of brightness, grey, color shade or the like, wherein each image point is considered to be a node of an artificial neural network, the image being processed as a function of parameters defining the appearance of each pixel as values of the nodes of the artificial neural network and as a function of connections of each pixel under processing with neighboring pixels composed of pixels of a predetermined subset of pixels, particularly with neighboring pixels of said pixel under processing, the so called pixel window,
while pixels of the new image i.e. of the processed image are obtained by iterative evolution steps of parameters defining the appearance such as evolution steps of the value of nodes or by iterative evolution steps of values of the set of connections or by a combination of said evolutions.

DESCRIPTION OF RELATED ART

A method of image processing is known from document WO 2005/020132 or EP 1 656 632, wherein fundamental principles of the method according to the present invention are described and whose disclosure is to be considered as a part of the present disclosure as regards base concepts.

Processing systems of the known method according to above documents work based on local, deterministic and iterative operations. The local ones are due to the fact that at each processing cycle operations involve a central pixel and its relationships with immediately adjacent pixels (neighborhood of the central pixel). The deterministic ones are due to the fact that the stationary condition towards which the dynamic system evolves, that is represented by the pixel matrix with the new image, is ordered by deterministic equations: therefore the processing can be repeated while leading always to the same result. Iterative ones are due to the fact that operations are iteratively repeated till the space evolution of steps, of the dynamic system, reaches their own attractor.

Summarizing basic theory concepts of known systems described above, a phenomenon with relevant topology in a D dimensional space, such as for example an image composed of an array of pixels or voxels or of an array of values each distinguishing the appearance of a pixel or voxel having a predetermined position in the array of pixels or voxels, can be represented by the minimum units called nodes and by local connections established one with the other. Each minimum unit u at the processing step n is defined by the position $x=(x_1, x_2, \ldots, x_D)$ taken by it into the phenomenon and by the quantitative value as a function of such position:

$$u^{[n]}_{x_1, x_2, \ldots, x_D} = u_x^{[n]} \qquad [2.1]$$

In practice let imagine minimum units u to be points arranged at position coordinates x to which a value called intensity is also given. For each unit u, the position x and the intensity value taken together at processing cycle n is summed up in the term $u_x^{[n]}$.

The starting given image has to be considered as composed of units at processing cycle "0", so each of its units is identified by the term $u_x^{[0]}$. When we will not make reference to the processing cycle n, but on the contrary we refer to a generically minimum unit, we will indicate it by the term u or ux if we desire to indicate also the position.

Let consider as the distance $dist(x, x_S)$ between positions $x=(x_1, x_2, \ldots, x_D)$ and $x_S=(x_1+k_{S1}, x_2+k_{S2}, \ldots, x_D+k_{SD})$ of two minimum units, the maximum one between absolute values of indexes $k_{Si}$ with $i=1, 2, \ldots, D$ where:

$$dist(x, x_s) = \max_{i=1,2,\ldots,D} \{|k_{Si}|\}. \qquad [2.2]$$

Given a position coordinate x (inside the given image), we consider the neighborhood of x with G radius the neighborhood $I_x^G$, centered on the position x, comprising x and all positions xS whose distance from x is not void and does not exceed G:

$$I_x^G = \{(x, x_S) | 0 < dist(x, x_S) \leq G\} \qquad [2.3]$$

In practice each neighborhood $I_x^G$ of x is composed only of all points xS satisfying [2.3] and of x itself. Position x is named as position of the central pixel of neighborhood $I_x^G$. The subscript S denotes the variability of the position of points xS of the neighborhood, distinguished from the central position x. In the two dimensional case (D=2) and with radius 1, S is the subscript denoting the position of 8 pixels of the neighborhood centered in the position x.

The set of positions x and xS belonging to respective neighborhoods $I_x^G$, since they are position coordinates, will be used without distinction for denoting positions of pixels of the starting given image, of images under processing, and of the final one. If we refer to neighborhoods with radius G=1, the neighborhood will be denoted by the simple notation $I_x$.

Each local connection between two minimum units, defines the force exerted by a minimum unit on the other one and viceversa. Therefore, once two minimum units are given there are always provided two local connections whose value is independent and generally it is different.

The connection between a minimum unit having a position $x=(x_1, x_2, \ldots, x_D)$ and another one having the positions $x_S=(x_{S1}, x_{S2}, \ldots, x_{SD})$ at step n will be defined by positions x and xs of connected units and by the quantitative value:

$$w^{[n]}_{(x_1, x_2, \ldots, x_D),(x_{S1}, x_{S2}, \ldots, x_{SD})} = w_{x, x_S}^{[n]} \qquad [2.4]$$

equal to:

$$w^{[n]}_{(x_1, x_2, \ldots, x_D),(x_1+k_{S1}, x_2+k_{S2}, \ldots, x_D+k_{SD})} \qquad [2.5]$$

where each coordinate both of x and xS is clearly indicated: $x_{S1}=x_1+k_{S1}$, $x_{S2}=x_2+k_{S2}$, $x_{SD}=x_D+k_{SD}$. On the contrary, in [2.4], a more simple notation is used wherein synthetically it is indicated $x_S=x+k_S$, where $k_S=(k_{S1}, k_{S2}, \ldots, k_{SD})$.

Therefore, generally speaking, the following notation is used: $w_{x, x_S}^{[n]}$ in order to intend the value of each connection between the minimum unit $u_x$ of the central pixel (placed in the position x of the neighborhood) and each minimum unit $u_{x_S}$ of pixels of the neighborhood $I_x^G$ (placed in positions xS) at processing step n.

Active Connection Matrixes are defined with respect to a neighborhood having radius G. For each minimum unit ux only connections between the central unit in position x and the ones $u_{x_S}$ of its neighborhood $I_{x_S}^G$ with radius G are considered.

The Active Connection Matrix is defined as the system composed of the following equations:

$$u^{[n+1]}_{x_1,x_2,\ldots,x_D} = f\big(u^{[n]}_{x_1,x_2,\ldots,x_D}, \ldots, u^{[n]}_{x_1+k_{S1},x_2+k_{S2},\ldots,x_D+k_{SD}}, \ldots,$$
$$w^{[n]}_{(x_1,x_2,\ldots,x_D),(x_1+k_{S1},x_2+k_{S2},\ldots,x_D+k_{SD})}\big) =$$
$$f\big(u^{[n]}_{x_1,x_2,\ldots,x_D}, \ldots, u^{[n]}_{x_{S1},x_{S2},\ldots,x_{SD}}, \ldots,$$
$$w^{[n]}_{(x_1,x_2,\ldots,x_D),(x_{S1},x_{S2},\ldots,x_{SD})}\big) = f\big(u^{[n]}_x, \ldots, u^{[n]}_{x_S}, \ldots, w^{[n]}_{x,x_S}\big)$$
[2.6]

and $$w^{[n+1]}_{(x_1,x_2,\ldots,x_D),(x_1+k_1,x_2+k_2,\ldots,x_D+k_D)} =$$
$$g\big(u^{[n]}_{x_1,x_2,\ldots,x_D}, u^{[n]}_{x_1+k_{S1},x_2+k_{S2},\ldots,x_D+k_{SD}},$$
$$w^{[n]}_{(x_1,x_2,\ldots,x_D),(x_1+k_{S1},x_2+k_{S2},\ldots,x_D+k_{SD})}\big) =$$
$$g\big(u^{[n]}_{x_1,x_2,\ldots,x_D}, u^{[n]}_{x_{S1},x_{S2},\ldots,x_{SD}}, \ldots, w^{[n]}_{(x_1,x_2,\ldots,x_D),(x_{S1},x_{S2},\ldots,x_{SD})}\big) =$$
$$g\big(u^{[n]}_x, u^{[n]}_{x_S}, w^{[n]}_{x,x_S}\big)$$
[2.7]

being valid:

$$\forall u^{[n]}_x e \forall w^{[n]}_{x,x_S} | (x,x_S) \in I_x^G = \{(x,x_S) | 0 < \text{dist}(x,x_S) \le G\}$$ [2.8]

and with initial fixed values $u^{[0]}_{x_1,x_2,\ldots,x_D} = u^{[0]}_x$, and $w^{[0]}_{(x_1,x_2,\ldots,x_D),(x_1+k_{S1},x_2+k_{S2},\ldots,x_D+k_{SD})} = w^{[0]}_{x,x_S}$.

The first equation [2.6] shows that the evolution of a unit depends on the value of the unit, on all units of the neighborhood, and on the one of $(2 \cdot G+1)^D - 1$ connections of all units of the hypercubic neighborhood with radius G; while $(2 \cdot G+1)^D - 1$ equations for the connections show that the evolution of each of them depends on the value of the connection and on the one of the two connected units.

In the two dimensional case (D=2) units of a phenomenon can be represented in a matrix, using more easily indexes i and j instead of x1 and x2, is given as:

$$\begin{matrix} \ldots & \ldots & \ldots & \ldots & \ldots \\ \ldots & u_{i-1,j-1} & u_{i,j-1} & u_{i+1,j-1} & \ldots \\ \ldots & u_{i-1,j} & u_{i,j} & u_{i+1,j} & \ldots \\ \ldots & u_{i-1,j+1} & u_{i,j+1} & u_{i+1,j+1} & \ldots \\ \ldots & \ldots & \ldots & \ldots & \ldots \end{matrix}$$

while equations [2.6 and 2.7] specialize and are detailed as follows:

$$u_{i,j}^{[n+1]} = f(u_{i,j}^{[n]},$$
$$u^{[n]}_{i-1,j-1}, u^{[n]}_{i,j-1}, u^{[n]}_{i+1,j+1}, u^{[n]}_{i-1,j}, u^{[n]}_{i+1,j}, u^{[n]}_{i-1,j+1}, u^{[n]}_{i,j+1}, u^{[n]}_{i+1,j+1},$$
$$w^{[n]}_{(i,j),(i-1,j-1)}, w^{[n]}_{(i,j),(i,j-1)}, w^{[n]}_{(i,j),(i+1,j-1)}, w^{[n]}_{(i,j),(i-1,j)},$$
$$w^{[n]}_{(i,j),(i+1,j)}, w^{[n]}_{(i,j),(i-1,j+1)}, w^{[n]}_{(i,j),(i,j+1)}, w^{[n]}_{(i,j),(i+1,j+1)})$$ [2.9]

$$w^{[n+1]}_{(i,j),(i-1,j-1)} = g(u_{i,j}^{[n]}, u^{[n]}_{i-1,j-1}, w^{[n]}_{(i,j),(i-1,j-1)})$$
$$w^{[n+1]}_{(i,j),(i,j-1)} = g(u_{i,j}^{[n]}, u^{[n]}_{i,j-1}, w^{[n]}_{(i,j),(i,j-1)})$$
$$w^{[n+1]}_{(i,j),(i+1,j-1)} = g(u_{i,j}^{[n]}, u^{[n]}_{i+1,j-1}, w^{[n]}_{(i,j),(i+1,j-1)})$$
$$w^{[n+1]}_{(i,j),(i-1,j)} = g(u_{i,j}^{[n]}, u^{[n]}_{i-1,j}, w^{[n]}_{(i,j),(i-1,j)})$$
$$w^{[n+1]}_{(i,j),(i+1,j)} = g(u_{i,j}^{[n]}, u^{[n]}_{i+1,j}, w^{[n]}_{(i,j),(i+1,j)})$$
$$w^{[n+1]}_{(i,j),(i-1,j+1)} = g(u_{i,j}^{[n]}, u^{[n]}_{i-1,j+1}, w^{[n]}_{(i,j),(i-1,j+1)})$$
$$w^{[n+1]}_{(i,j),(i,j+1)} = g(u_{i,j}^{[n]}, u^{[n]}_{i,j+1}, w^{[n]}_{(i,j),(i,j+1)})$$
$$w^{[n+1]}_{(i,j),(i+1,j+1)} = g(u_{i,j}^{[n]}, u^{[n]}_{i+1,j+1}, w^{[n]}_{(i,j),(i+1,j+1)})$$ [2.10]

In the general case of a phenomenon with a relevant topology in a D dimensional space and with minimum connected elements with radius G, a variation of a unit at step n, determines at step n+1 a propagation of the effect up to distant unit g(n+1) positions, with:

$$g(n+1) = (n+1) \cdot G$$ [2.11]

and so, still at step n+1, the number r(n+1) of units hit by the variation of the neighborhood, excluding the central unit, is equal to:

$$r(n+1) = (2 \cdot (n+1) \cdot G + 1)^D - 1$$ [2.12]

Similarly, in addition it is possible to observe how the number of delay steps $\Delta n$ with which two units ux and $u_{x_S}$ influence each other is equal to:

$$\Delta n = \max_{1 \le S \le D} \left(0, \left\lceil \frac{|x_S - x|}{G} \right\rceil - 1\right)$$ [2.13]

Therefore, based on such considerations it can be noted how equations [2.6 and 2.7] can easily led to:

$$u^{[n+1]}_{x_1,x_2,\ldots,x_D} = f^{[n]}\big(u^{[0]}_{x_1,x_2,\ldots,x_D}, \ldots, u^{[0]}_{x_1+k_{S1},x_2+k_{S2},\ldots,x_D+k_{SD}},$$
$$\ldots, w^{[0]}_{(x_1,x_2,\ldots,x_D),(x_1+k_{S1},x_2+k_{S2},\ldots,x_D+k_{SD})}, \ldots\big) =$$
$$f^{[n]}\big(u^{[0]}_{x_1,x_2,\ldots,x_D}, \ldots, u^{[0]}_{x_{S1},x_{S2},\ldots,x_{SD}}, \ldots,$$
$$w^{[0]}_{(x_1,x_2,\ldots,x_D),(x_{S1},x_{S2},\ldots,x_{SD})}\big) f^{[n]}\big(u^{[0]}_x, \ldots, u^{[0]}_{x_S}, \ldots, w^{[0]}_{x,x_S}\big)$$ [2.14]

and $$w^{[n+1]}_{(x_1,x_2,\ldots,x_D),(x_1+k_1,x_2+k_2,\ldots,x_D+k_D)} =$$
$$g^{[n]}\big(u^{[0]}_{x_1,x_2,\ldots,x_D}, u^{[0]}_{x_1+k_{S1},x_2+k_{S2},\ldots,x_D+k_{SD}},$$
$$w^{[0]}_{(x_1,x_2,\ldots,x_D),(x_1+k_{S1},x_2+k_{S2},\ldots,x_D+k_{SD})}\big) =$$
$$g^{[n]}\big(u^{[0]}_{x_1,x_2,\ldots,x_D}, u^{[0]}_{x_{S1},x_{S2},\ldots,x_{SD}}, \ldots,$$
$$w^{[0]}_{(x_1,x_2,\ldots,x_D),(x_{S1},x_{S2},\ldots,x_{SD})}\big) = g^{[n]}\big(u^{[0]}_x, u^{[0]}_{x_S}, w^{[0]}_{x,x_S}\big)$$ [2.15]

being valid:

$$\forall u^{[0]}_x e \forall w^{[0]}_{x,x_S} | (x,x_S) \in I_x^{(n+1)G}$$ [2.16]

By means of them it can be pointed out how the path described by the dynamic system, composed of the phenomenon matrix (i.e. pixels of the starting image), during the evolution depends on initial values of units and of connections within a neighborhood that expands at each step. The fact that units and connections depend on initial values is represented by the sequence of functions $f^{[n]}$ and $g^{[n]}$:

the first one being composed of functions with a number of arguments that increases with n and it is equal to:

$$2 \cdot (2 \cdot (n+1) \cdot G + 1)^D - 1$$ [2.17]

while the second one has functions with the same number of arguments.

[2.6] and [2.7] indicate the evolution of units and connections of a phenomenon with a relevant topology towards an attractor representing the set of its solutions. Both of them can be provided in two degenerate forms requiring a special attention.

The first one considers fixed connections. In this case, connections are fixed at their initial value, while as regards units we have:

$$u^{[n+1]}_{x_1,x_2,\ldots,x_D} = f\bigl(u^{[n]}_{x_1,x_2,\ldots,x_D}, \ldots, u^{[n]}_{x_1+k_{S1},x_2+k_{S2},\ldots,x_D+k_{SD}}, \ldots,$$
$$w^{[0]}_{(x_1,x_2,\ldots,x_D),(x_1+k_{S1},x_2+k_{S2},\ldots,x_D+k_{SD})}\bigr) =$$
$$f\bigl(u^{[n]}_{x_1,x_2,\ldots,x_D}, \ldots, u^{[n]}_{x_{S1},x_{S2},\ldots,x_{SD}}, \ldots,$$
$$w^{[0]}_{(x_1,x_2,\ldots,x_D),(x_{S1},x_{S2},\ldots,x_{SD})}\bigr) = f\bigl(u^{[n]}_x, \ldots, u^{[n]}_{x_S}, \ldots, w^{[0]}_{x,x_S}\bigr) \quad [2.18]$$

being valid:

$$\forall u_x^{[n]} e \forall w_{x,x_S}^{[0]} | (x,x_S) \in I_x^{(n+1)G} \quad [2.19]$$

and with starting fixed values $u^{[0]}_{x_1,x_2,\ldots,x_D} = u_x^{[0]}$ and $w^{[0]}_{(x_1,x_2,\ldots,x_D),(x_1+k_{S1},x_2+k_{S2},\ldots,x_D+k_{SD})} = w^{[0]}_{x,x_S}$.

In this case connections of the phenomenon act only as an impulse of the process and as a constraint to the evolution of units occurring in the space of units.

The second degenerate case is symmetrical with respect to the first one as regards units and connections. In this case they are considered as units fixed at their initial value, acting as an impulse for the process. For such type of system the following equations are valid:

$$w^{[n+1]}_{(x_1,x_2,\ldots,x_D),(x_1+k_{S1},x_2+k_{S2},\ldots,x_D+k_{SD})} = \quad [2.20]$$
$$w^{[n+1]}_{x,x_S} = g\bigl(u^{[0]}_{x_1,x_2,\ldots,x_D}, u^{[0]}_{x_1+k_{S1},x_2+k_{S2},\ldots,x_D+k_{SD}},$$
$$w^{[n]}_{(x_1,x_2,\ldots,x_D),(x_1+k_{S1},x_2+k_{S2},\ldots,x_D+k_{SD})}\bigr) =$$
$$g\bigl(u^0_{x_1,x_2,\ldots,x_D}, u^{[0]}_{x_{S1},x_{S2},\ldots,x_{SD}}\bigr) = g\bigl(u_x^{[0]}, u_{x_S}^{[0]}, w_{x,x_S}^{[n]}\bigr)$$

being valid:

$$\forall u_x^{[0]} e \forall w_{x,x_S}^{[0]} | (x,x_S) \in I_x^{(n+1)G} \quad [2.21]$$

and with starting fixed values $u^{[0]}_{x_1,x_2,\ldots,x_D} = u_x^{[0]}$ and $w^{[0]}_{(x_1,x_2,\ldots,x_D),(x_1+k_{S1},x_2+k_{S2},\ldots,x_D+k_{SD})} = w^{[0]}_{x,x_S}$.

The peculiarity of such evolution is the fact that the process setting the evolution of connections occurs in the connection space. Inside this space solutions to unit evolution are found.

Therefore, in such process, original values of units act as a mere constraint to the evolution of connections. The latter dynamically provide the value of units, and so, the attractor of such a process will be the redefinition of each unit as a mere relational element, generated by the dynamic negotiation between its initial value and the initial one of other units adjacent thereto.

A particular simple embodiment is the case of two-dimensional images wherein indexes i, j are the two dimensions of a plane image. Starting from such example it is possible to describe various known systems in the general D dimension case. The synthetic notation described above will be used in order to simplify the reading. The set of indexes representing coordinates of involved units will be replaced by points x and xs of the neighborhood $I_x^G$. As already said, since position coordinates are equal for all images, the neighborhood will be centered in the central point x, the unit ux that will be used as a reference will be supposed to be positioned therein and, positions of other units $u_{x_S}$ falling inside the neighborhood $I_x^G$ will be changed with respect to such position:

$$x_S = x + k_S \text{ with } I_x^G = \{(x,x_S) | 0 < \text{dist}(x,x_S) \leq G\} \quad [2.22]$$

As noted above, families of the known method differ one with respect to the other depending on how they allow units and connections to evolve. Particularly they are divided into three families based on following evolution laws:

Fixed connections: units ux are allowed to evolve till reaching a stationary state identifying the presence of an attractor. The stationary state, and so the attractor, change depending which evolution law is used. A connection matrix is used that is determined (firstly) by an equation called Automata Rule using the matrix of pixels of the given image.

Fixed units: Connections $w_{x,x_S}$ are allowed to evolve till reaching a stationary state identifying the presence of an attractor. The stationary state, and so the attractor, change depending on which evolution law is used. It uses the matrix of pixels of the given image that remains constant at each processing cycle;

Dynamic Units and Connections: connections $w_{x,x_S}$, reach their own attractor on the basis of the matrix of units $u_x$ updating at each processing cycle. Now brightness of pixels of the matrix of units $u_x$, is updated when the system evolves taking part in correcting the connection matrix.

From the above it is clear that known methods act as being based on the supposition that new morphologic and dynamic regularities, that can be seen in images processed by any of the three families mentioned above, are the result of local, deterministic and iterative operations performed on the matrix of pixels of the starting image and of the coonection matrix of each pixel to its local neighborhood.

SUMMARY OF THE INVENTION

The aim of the present invention is to enlarge relationships between the central pixel and its neighboring pixels, in order to extend the range of operations to the whole system thus making the processing as a not strictly local one.

The invention achieves the above aims by providing a method of the type described hereinbefore and wherein the processing occurs by evolution iterative steps where each step is a function also of connections of neighboring pixels with the pixel under examination, when each of said neighboring pixels of the pixel under examination is considered also as a neighboring pixel of at least one or of all pixels adjacent to said neighboring pixel further to the said pixel under examination, which function is an immediate feedback contribution for determining appearance values of all other pixels in that the appearance values of each pixel of the image contributes to the determination of the new appearance values of all the other pixels of the new image resulting from the said iterative step.

Therefore, by the invention relationships between the central pixel and its neighboring pixels are enlarged by the fact of comprising also relationships thereof when each of them is also the neighboring pixel of all pixels adjacent thereto. In such case, an contrary to the prior art techniques in which each processing step determines the new value of a target pixel as a function only of the pixels inside a limited neighborhood (for example a 3×3 square matrix) of the said target pixels considering the whole contributions of the function disclosed above at each processing cycle for obtaining the new image, means that the appearance values of each pixel give an immediate feedback contribution for determining the new appearance values all other pixels in the image. This can be represented by another example as all stresses coming from each point of the territory would contemporaneously take part in determining a mountain region.

The new method according to the present invention comprises the partecipation of all neighboring pixels in evolving the connection matrix that at the end is used for creating pixel matrix with the new image resulting from the processing, in a more considerable way with respect to case (c) described above of the known method.

The method according to the present invention provides to use new equations considering values of neighboring pixels and of its connections with the central pixel, and also subsequent order relationships deriving when each of them is considered as a neighboring pixel of its own adjacent pixel, when the latter is considered as central pixel. That, repeated at each processing cycle, allows each pixel to give its contribution to each pixel distant therefrom by means of neighboring pixels that propagate, like waves, such contribution.

Equations defining the method according to the present invention are divided in two sets:

The set of equations aiming at evolving the value of connections of each image point or pixel or voxel of the given image;

The set of equations aiming at evolving the value of the inner state of each image point or pixel or voxel of the given image.

Further improvements of the present invention are object of the dependent claims.

BRIEF DESCRIPTION OF THE DRAWINGS

Characteristics of the invention and advantages deriving therefrom will be more clear from the following description and from annexed figures wherein:

FIG. 2 and FIG. 3 are an ellipse affected by noise in FIG. 2 taken as an horizontal section at the centre of the plan image of FIG. 3 respectively the size of the ellipse is 253×189 pixels (from T. Hansen, H. Neumann, Neural Networks 17 (2004) 647-662).

FIGS. 4 and 5 are two attempts for extracting the edge of the ellipse using a commercial software and particularly Adobe Photoshop 7.0.

FIG. 6 is the same attempt of FIGS. 4 and 5 but using the method according to the present invention stopped after five cycles i.e. after five iterations.

FIG. 7 is the processing result by a known processing method called Cell model with DOI.

FIG. 8 is the processing result by the method according to the invention wherein the rule used for stopping the sequence of iterative steps is the energy minimization criterion according to equation (17).

FIG. 13a: breast Rx: detail of spiculate mass (Calma Project), FIG. 13b: the processing result of the method according to the present invention after the first 7 cycles, FIG. 13c is the processing result according to the present invention following the convergence.

FIG. 13d is processing results of image 13a obtained by the method of the present invention wherein different values of the threshold α (alpha) have been used.

FIG. 15e is a sequence of images starting from image 15a to image 15a6, images of 15a1 to 15a6 being processed using different positive values of α, for increasing the sensitivity at each processing in order to find patterns hidden in the background.

FIG. 15f is a sequence of images starting from image 15b to image 15b6, images of 15b1 to 15b6 being processed by the method according to the present invention that is carried out decreasing values of α, in order to make the method at each processing less and less sensible to certain bright intensities, as if a return back in time occurs.

FIG. 16e is a sequence of images starting from image 16a to image 16a6, 16a1 to 16a6 images being processed with different positive values of α.

DETAILED DESCRIPTION OF EMBODIMENTS OF THE INVENTION

Figure 1:
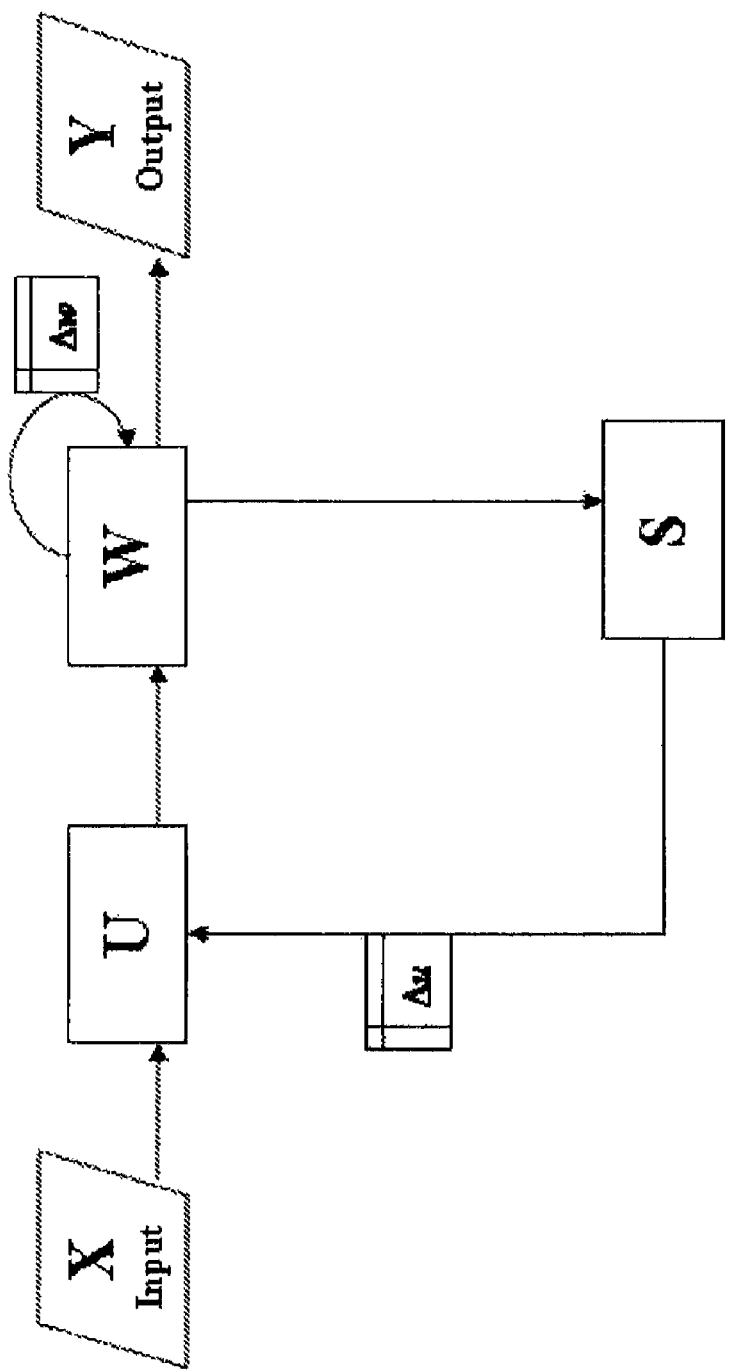
FIG. 1 is a flowchart of the method according to the present invention.

Processing equations will be reproduced below for which the following is defined:

$W_{i,j}^{[0]}=0.0$; (Eq 0) initial value of the connection between any two pixels.

$u_i \in [-1+\alpha, 1+\alpha]$; Initial scaling of the value of all pixels of the given image.

α=scaling threshold of pixel values.

$x^{[n]}$=x at n step; any variable (connection, pixel, etc.) at a certain processing cycle.

$P_i^{[n]}$=i-th Pixel at n step;

$Out_i^{[0]}$=i-th Output at n step;

$S_i^{[0]}$=i-th State at n step;

N=neighboring nodes.

The set of equations regulating the value of connections of each pixel can be divided in four steps:

$$D_i = \sum_{j}^{N} (u_j^{[n]} - W_{i,j}^{[n]});$$ (Eq 1)

As it is clear, the factor $D_i$ is not a distance, but it is merely a sum of differences between the value of each pixel and the weight with which the central pixel is connected thereto.

$$J_i = \frac{e^{D_i} - e^{-D_i}}{e^{D_i} + e^{-D_i}};$$ (Eq 2)

The variable $J_i$ is the result of the application of the hyperbolic tangent function to the factor $D_i$. This operation has three aims:
  Enclosing possible values of $D_i$ in a finite interval;
  Providing a smooth sigmoid shape to possible values of $D_i$;
  Working with a function differentiable in each point.

$$\Delta W_{i,j}^{[n]} = -(u_i^{[n]} \cdot J_i) \cdot (-2 \cdot J_i) \cdot (1 - J_i^2) \cdot (u_j^{[n]} - W_{i,j}^{[n]});$$ (Eq 3)

This equation can be divided into three components:
  a. the first component, $-(u_i^{[n]} \cdot J_i)$, weights the value of the central pixel with the variable $J_i$ depending on its neighborhood (weights and pixels). However, it reverses the classical mathematic relation among signs: in this case, the concordance produces a negative value, while the discordance produces a positive value. That means:
    1. If the central pixel tends towards black (negative value) and weights connecting it to its neighborhood on average are greater than pixels of such neighborhood, the value of such portion of the equation will be negative;
    2. If the central pixel tends towards black (negative value) and weights connecting it to its neighborhood are on average smaller than pixels of such neighborhood, the value of such portion of the equation will be positive;
    3. If the central pixel tends to white (positive value) and weights connecting it to its neighborhood are on average greater than pixels of such neighborhood, the value of such portion of the equation will be positive;
    4. If the central pixel tends to white (positive value) and weights connecting it to its neighborhood are on average smaller than pixels of such neighborhood, the value of such portion of the equation will be negative;
  b) the second component of the equation (3), $(-2 \cdot J_i) \cdot (1 - J_i^2)$, is the second derivative of $J_i$. It analyses how the variation between neighboring pixels and weights with which the central pixel is connected thereto changes;
  c) the third component of the equation (3) weights the whole equation by the difference between each neighboring pixel and the weight with which the central pixel is connected thereto.

$$W_{i,j}^{[n+1]} = W_{i,j}^{[n]} + \Delta W_{i,j}^{[n]};$$ (Eq 4)

In this equation weights connecting the central pixel to each pixel of its neighborhood are updated.

In these first four equations defining four steps the following can be noted:
  a. all connections between the central pixel and its neighborhood depend on the value of the neighboring pixels;
  b. each connection between the central pixel and each pixel of its neighborhood depends on all neighboring pixels.

Therefore, the evolution of weights is a first order transformation of each pixel of the given image (each pixel with respect to its neighborhood).

These first equations of the method according to the present invention are already able to determine interesting transformations of any image.

At each evolution cycle it is sufficient to compute the average of output weight values of each central pixel and to suitably scale such value between 0 and 255 (range of values that pixels can obtained in the image) in order to achieve transformations dividing the image in two parts: figure and background.

$$P_i^{[n]} = Scale_{Pixel} \cdot \frac{\sum_{j}^{N} W_{i,j}^{[n]}}{N} + Offset_{Pixel};$$ (Eq 5)

$$P_i^{[n]} \in [0, MaxPixelOut];$$

$$Scale_{Pixel} = \frac{MaxPixelOut}{(MaxW - MinW)};$$ (Eq 6)

$$Offset_{Pixel} = -\frac{MinW \cdot MaxPixelOut}{MaxW - MinW}$$

The fact of using different values of the value $\alpha$ at the initial scaling (Eq 0), leads to a change in figure edges with respect to the background.

As regards the set of equations aiming at evolving the value of the inner state of each image point or pixel or voxel of the given image, such equations whose aim is to modify the activation of units u can also be divided in different steps:

$$Out_i^{[n]} = Scale_{Out} \cdot \frac{\sum_{j}^{N} W_{i,j}^{[n]}}{N} + Offset_{Out};$$ (Eq 7)

$$Out_i^{[n]} \in [-1, +1];$$

$$Scale_{Out} = \frac{2}{MaxW - MinW};$$ (Eq 8)

$$Offset_{Out} = -\frac{MaxW + MinW}{MaxW - MinW}$$

The aim of such equations is to scale the average of the value of connections of each central pixel with its neighborhood in a numerical set in the interval $\{-1, +1\}$.

The result of such scaling, taken as its absolute value, defines the inner activation state of each central pixel:

$$S_i^{[n]} = |Out_i^{[n]}|;$$ (Eq 9)

Therefore, considering the pixel value, it can be said that: the more the average of weights connecting each central pixel to its own neighborhood is far away from a neutral value ("zero" if values are scaled between −1 and +1, or "grey 127" if values are scaled between 0 and 255), the more the inner state of that central pixel is active.

Now by means of the following equation, we give each pixel a "delta factor", $\Delta S_{i,j}^{[n]}$, considering its activation value and the activation value of each pixel of which it is the neighborhood:

$$\Delta S_{i,j}^{[n]} = -\mathrm{Tan}H(S_i^{[n]} + u_j^{[n]}) = -\frac{e^{(S_i^{[n]} + u_j^{(n)})} - e^{-(S_i^{[n]} + u_j^{[n]})}}{e^{(S_i^{[n]} + u_j^{[n]})} + e^{-(S_i^{[n]} + u_j^{[n]})}};$$ (Eq 10)

The equation (10) is important for various reasons:

each pixel of a two-dimensional image, if the radius is an unit one, has a neighborhood made of at least 8 other pixels; this means that, when Eq. (10) is applied, the more the inner state of the central pixel tends towards 1 and the more the activation of the neighboring pixel is greater then zero, the more $\Delta S^{[n]}_{i,j}$ will have an opposite sign with respect to the value of the neighboring pixel; while, the more the inner state of the central pixel tends towards 1 and the more the activation of the neighboring pixel tends towards −1, the more $\Delta S^{[n]}_{i,j}$ will tend towards zero.

The square sum of 1 complements of $\Delta S^{[n]}_{i,j}$ of each neighborhood of each neighboring pixel, suitably weighted, will define the second order $\phi_i^{[n]}$ of each image pixel.

$$\varphi_i^{[n]} = LCoef \cdot u_i^{[n]} \cdot \sum_j^N (1 - \Delta S_{j,i}^{[n]2});$$ (Eq 11)

Now the following equation takes in consideration a function of the sum of $\phi_j^{[n]}$ composing the neighborhood of each pixel, and so, they take into consideration third order variations of each pixel:

$$\psi_i^{[n]} = \sum_j^N \mathrm{Tan}H(\varphi_j^{[n]}) = \sum_j^N \frac{e^{\varphi_j^{[n]}} - e^{-\varphi_j^{[n]}}}{e^{\varphi_j^{[n]}} + e^{-\varphi_j^{[n]}}};$$ (Eq 12)

While the vector $\phi_i^{[n]}$ defines the closed edge of the given image, the vector $\psi_i^{[n]}$ is responsible for the progressive generation of edge waves moving from the initial edge to the most bright portion of the image, defining a sort of "skeleton" of the image by means of their constructive and destroying interferences.

The following equation considers the intersection between second and third order contributions suitable for defining the final variation that each image unit will receive:

$$\delta u_i^{[n]} = \phi_i^{[n]} \cdot \psi_i^{[n]};$$ (Eq 13)

As a result, the final equation modifying the activation of each image unit at the subsequent cycle will be as follows:

$$u_i^{[n+1]} = u_i^{[n]} + \delta u_i^{[n]}.$$ (Eq 14)

The rule for stopping iterative processing steps of the present method is related to the stabilization of connection value (see Eq 3).

More in details, the energy of the system, $E^{[n]}$, is given by summing changes of connection values of the whole image at each processing cycle, according to the following equation:

$$E^{[n]} = \sum_{x=1}^{X} \sum_{s=1}^{N} (\Delta w_{x,x_s}^{[n]})^2;$$ (Eq 15a)

where:

$X$ = cardinality of pixel of the given image $N$ = Neighborhood with unit radius of each pixel $X, x_s$ = $x$-th pixel and its neighborhood The system evolution causes the system energy to decrease as processing cycles increase:

$$\lim_{n \to \infty} E^{[n]} = 0.$$ (Eq 15b)

That means that the system energy at the end of the evolution will be minimum:

$$E^* = \min\{E^{[n]}\}$$ (Eq 15c)

Therefore, in a more abstract way the method according to the present invention can be represented by the flowchart of FIG. 1.

Initial values of pixels define the activation U of each pixel and the initial connection matrix as defined by above equations. The box Δw denoted by 10 identifies evolution steps of the connection matrix followed by the determination of the inner state S of each pixel on whose base the evolution of the activation U of pixels is performed. Starting from such new value it is possible to carry out one or more further iterative steps till reaching the final processing condition according to which the matrix of weights defined by the evolution of the last processing step produces values of pixels of the processed image.

Various tests have shown the ability of the method according to the present invention in extracting the edge from an image, after few cycles.

Test 1

As the starting image the image of an ellipse of FIG. 3 has been used subjected to noise such as shown in FIG. 2. Such image has been taken from document T. Hansen, H. Neumann, Neural Networks 17 (2004) 647-662.

The extraction of the edge of the ellipse of said image has been performed by using commercial software Photoshop (Adobe Photoshop 7.0). Such as shown in FIGS. 4 and 5 the commercial software has some troubles in extracting the ellipse edge from the background.

The same attempt was performed by using the method according to the present invention. The result obtained after cycles is composed of a sharp and accurate edge shown in FIG. 6.

The starting figure has been processed also by using a new cell model with dominating opponent inhibition (T. Hansen, H. Neumann, "A simple cell model with dominating opponent inhibition for a robust image processing", Neural Networks 17 (2004) 647-662). The best result shown in such work is shown in FIG. 7. It is clear that also in such model the edge of the figure has a variable intensity and it is made smoother by a subsequent logic interpolation. By enlarging the original figure it can be noted how the darker ones on the ellipse edge have an uneven trend that is typical of digitalized circles and ellipses.

On the contrary, the method according to the present invention produces a perfectly closed ellipse, having a constant intensity line and an edge reflecting the negotiation process dynamically independently reached by local pixels.

After the first cycles, when the ellipse edge is defined, the method according to the present invention goes on with its path towards the convergence, outlining the inner skeleton of the ellipse, such as shown in FIG. 8.

The method, after having found and pointed out the edge of the prevalent figure in the image (the ellipse), has spontaneously produced "waves" towards the inner portion of the figure. The fact that such waves meet one with the other has produced constructive interferences (values tending toward the white) and destroying ones (values tending towards the black). Therefore destroying interferences have drawn the skeleton of the figure with such an accuracy to perfectly identify also the two ellipse focuses.

Test 2

Figures 10, 12:
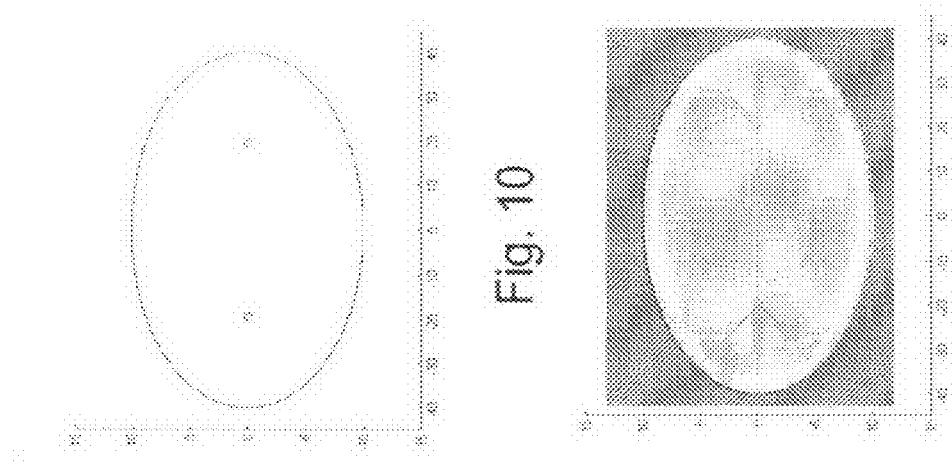
FIGS. 9 and 10 are an image of an ellipse and the corresponding position of the two focuses thereof.
FIGS. 11 and 12 are: the figure of the ellipse from FIG. 9 equalized and processed with the method according to the invention and the superimposition of the image of focuses of FIG. 10 on the processed image of FIG. 11 respectively.
Figures 9, 11:
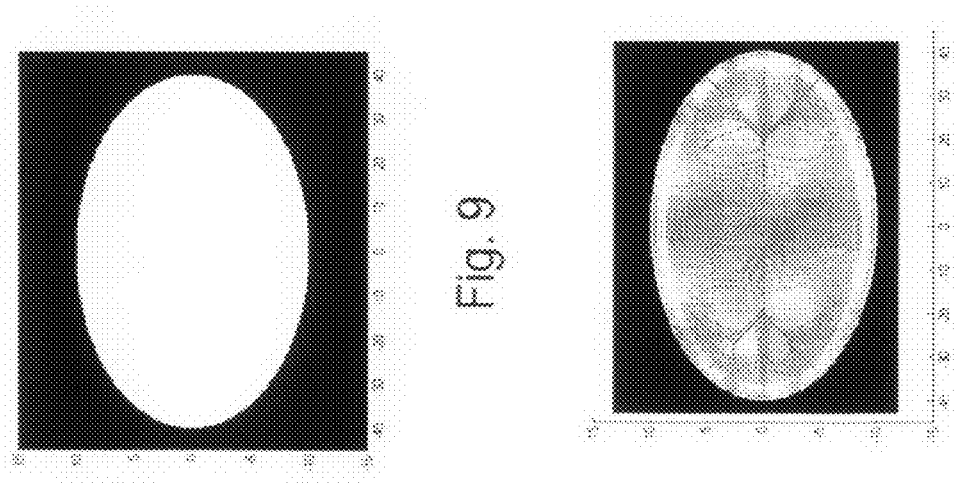

A specific test has been taken in order to verify the above assertion. An ellipse has been graphically generated by means of MatLab and its focuses have been analytically computed. The images of the ellipse and of focuses are indicated in FIGS. 9 and 10. Then the empty shape of the ellipse has been processed by means of the method according to the present invention, and, finally, the image obtained by the method according to the present invention has been superimposed on the one that analytically shows the position of the two focuses (FIG. 10). The result of the processing and superimposition are shown in FIGS. 11 and 12.

Figure 13C:
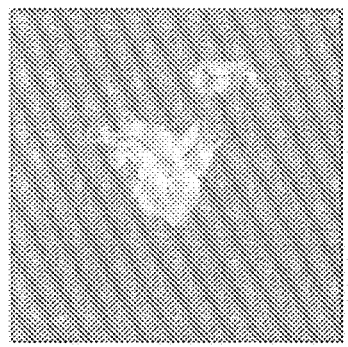
FIGS. 13a, 13b, 13c are as follows
Figure 13B:
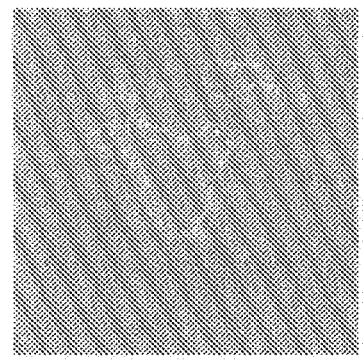
Figure 13A:
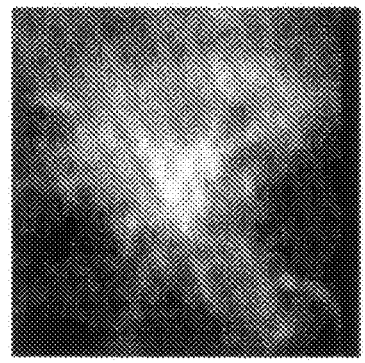

The method according to the present invention can have important medical applications due to its ability in extracting from an image figures constituting it, on the basis of brightness. In the breast tumor field the fact of defining the edge of the tumor and its structure can be useful for the physician. An example is shown in the sequence of FIGS. 13a to 13c. In this case the image 13a shows a typical radiographic diagnostic image of the breast wherein a so called speculate mass can be noted. The image has been processed by using the method according to the present invention obtaining the results of FIGS. 13b after first 7 iteration cycles of the method and the results of FIG. 13c upon reaching the convergence condition.

Figure 14C:
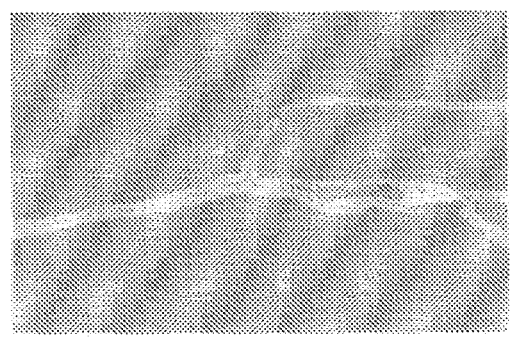
FIGS. 14a, 14b, 14c similarly to FIGS. 13a to 13c are processing results by the method of the present invention of a digital subtraction angiography: popliteal artery (Galeazzi Hospital of Milan) FIG. 14a, the processing result by the method according to the invention carried out for the first 12 cycles FIG. 14b and the processing result by the method according to the invention following the convergence FIG. 14c respectively.
Figure 14B:
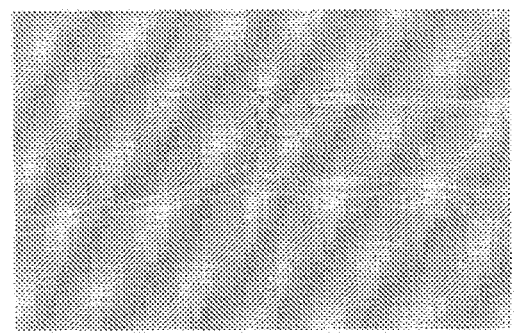
Figure 14A:
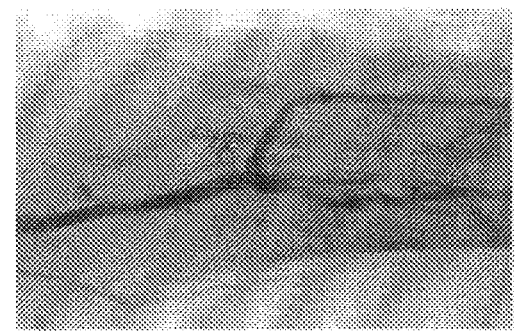

Such as shown in FIGS. 14a to 14c the method according to the present invention provides useful results also in the case of particularly sophisticated images such as digital subtraction angiography. Said figures clearly show the ability of the method according to the present invention in finding inner stenoses which were not apparent by the surgeon.

In such processing, values of the initial image have been scaled between −1 and +1 and so factor $\alpha$ of Eq(0) was implicitly equal to zero. Such factor determines the sensitivity threshold of the system to the image brightness. A table indicating the ratio between the threshold and unit scaling exemplarily sums up what said above:

TABLE 1

Ratio between the threshold and unit scaling.

| | |
|---|---|
| $\alpha = -1.0$ | $u \in [-2.0, 0.0]$; |
| $\alpha = -0.9$ | $u \in [-1.9, +0.1]$; |
| $\alpha = -0.8$ | $u \in [-1.8, +0.2]$; |
| $\alpha = -0.7$ | $u \in [-1.7, +0.3]$; |
| $\alpha = -0.6$ | $u \in [-1.6, +0.4]$; |
| $\alpha = -0.5$ | $u \in [-1.5, +0.5]$; |
| $\alpha = -0.4$ | $u \in [-1.4, +0.6]$; |
| $\alpha = -0.3$ | $u \in [-1.3, +0.7]$; |
| $\alpha = -0.2$ | $u \in [-1.2, +0.8]$; |
| $\alpha = -0.1$ | $u \in [-1.1, +0.9]$; |
| $\alpha = 0.0$ | $u \in [-1.0, +1.0]$; |
| $\alpha = +0.1$ | $u \in [-0.9, +1.1]$; |
| $\alpha = +0.2$ | $u \in [-0.8, +1.2]$; |
| $\alpha = +0.3$ | $u \in [-0.7, +1.3]$; |
| $\alpha = +0.4$ | $u \in [-0.6, +1.4]$; |
| $\alpha = +0.5$ | $u \in [-0.5, +1.5]$; |
| $\alpha = +0.6$ | $u \in [-0.4, +1.6]$; |
| $\alpha = +0.7$ | $u \in [-0.3, +1.7]$; |
| $\alpha = +0.8$ | $u \in [-0.2, +1.8]$; |
| $\alpha = +0.9$ | $u \in [-0.1, +1.9]$; |
| $\alpha = +1.0$ | $u \in [0.0, +2.0]$; |

The image of FIG. 13a can be processed by the method according to the present invention with different thresholds $\alpha$ in an independent way. Images processed with different thresholds $\alpha$ will point out final images with different figures. Smallest factors $\alpha$ will point out only figures provided with a more intense brightness, while greatest factors $\alpha$ will point out only figures provided with a less and less intense brightness. Therefore different values of $\alpha$ perform on the given image a scan of different bright intensities.

The image Rx of the breast mass of FIG. 13 can clearly show what said above by the sequence of results shown in FIG. 13d and pointed out by the corresponding threshold value $\alpha$.

If the brightness intensity is somehow proportional to the activity of the pathology under examination in a medical image, so in such cases different scans obtained by the method according to the present invention can be used in order to find a time order of the development of the pathology.

For example, in lung tumors, the fact that the different brightness intensity in computerized tomography (CT) reflects regions where the tumor is more active can be supposed. In the case of malignant tumors more peripheral regions can seem as dark as the background to the human eye, while on the contrary they would have brightness "light shadows", indicating exploratory and diffusive strategies of the tumor. Such very small changes in the brightness can be so thin that other analyzing algorithms could easily consider them as "noise" and could remove them. On the contrary the method according to the present invention seems able to differentiate cases when brightness variations of the background are a simple noise and when such variations are an hardly outlined image model.

As it will be shown below, the fact of scanning the original image by the method according to the present invention by changing the threshold $\alpha$ makes it possible to point out some development shapes of lung tumors one or two years before.

In order to verify such theory different tests have been taken some examples of which are listed below. A study and images published by a group of research workers in 2000 on a well known scientific review have been used for tests:

Authors: AOKI T. (1), NAKATA H. (1), WATANABE H. (1), NAKAMURA K. (1), KASAI T. (2), HASHIMOTO H. (2), YASUMOTO K. (3), KIDO M. (4). Affiliations:

1) Department of Radiology, University of Occupational and Environmental Health School of Medicine, Yahatanishi-ku, Kitakyushu-shi, 807-8555, Japan 2) Department of Pathology and Oncology, University of Occupational and Environmental Health School of Medicine, Kitakyushu-shi, 807-8555, Japan 3) Department of 2nd Surgery, University of Occupational and Environmental Health School of Medicine, Kitakyushu-shi, 807-8555, Japan 4) Department of Respiratory Disease, University of Occupational and Environmental Health School of Medicine, Kitakyushu-shi, 807-8555, Japan Title: "Evolution of peripheral lung adenocarcinomas: CT findings correlated with histology and tumor doubling time".

Review: American journal of roentgenology (Am. j. roentgenol.) 2000, vol. 174, no3, pp. 763-768.

Two pairs of lung tumor images have been taken from such research (Aoki 2000). Each pair showed the tumor at first CT moment (time 0) and one or 3 years later (Time 1). Research workers stated that at Time 0 images did not allow the tumor to be definitely diagnosed.

The two pairs of images are the ones of FIGS. 15a and 15b and 16a and 16b respectively.

On the pair of images 15*a* and 15*b* two tests have been taken: the first one by processing the first image (FIG. 15*a*) by different positive values of α. That in order to increase at each processing operation the sensitivity in finding patterns hidden in the background. The processing result is shown in the sequence of images 15*a*1 to 15*a*6 of FIG. 15*e*.

Figure 15B:
FIGS. 15a and 15b are a glandular cancer of the B type in a 74-year-old man wherein the starting CT scan shows a 22×22 mm background localized opacity in the lower left lobe of lung and the same carcinoma obtained by a CT scan 349 days after the initial scan which image shows an increased size (23×26 mm) and the development of a vascular convergence, while the attenuation at the tumor centre is slightly increased respectively.
Figure 15A:
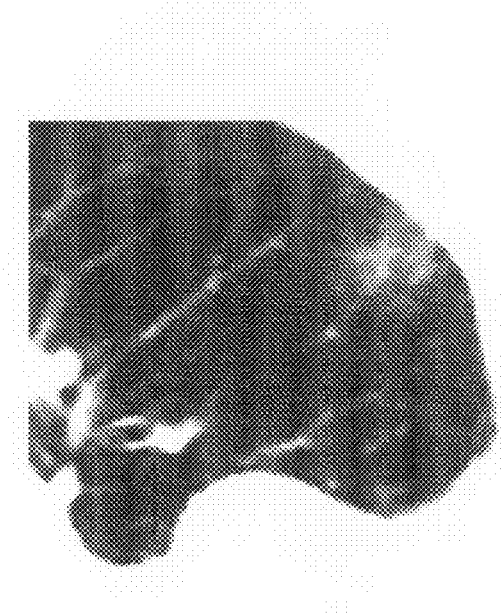

It can be noted how FIG. 15*a*.1 photographs very accurately the edge of the tumor of the source figure (FIG. 15*a*), while in FIG. 15*a*.2 to FIG. 15*a*.5 the tumor edge changes more and more and seemingly without a reason with respect to the original figure (FIG. 15*a*).

However it can be noted that edges of FIGS. 15*a*.5 and 15*a*.6 are very much alike the shape the tumor will take in the same patient a year later (see FIG. 15*b*).

In the second test the tumor image 1 year later (FIG. 15*b*) has been processed. This time, different processings have been performed decreasing the values of α. That in order to make the method less and less sensible to certain brightness intensities at each processing, as a return back in time is desired. Processing results of this second test are shown in the sequence of images 15*b*1 to 15*b*6 of FIG. 15*f*.

It can be noted from these images that the tumor edge of FIG. 15*b*1 is like the tumor edge of FIG. 15*a*5. Similarly, the tumor edge of FIG. 15*a*1 can be practically superimposed on the tumor edge of FIG. 15*b*6.

Figure 15D:
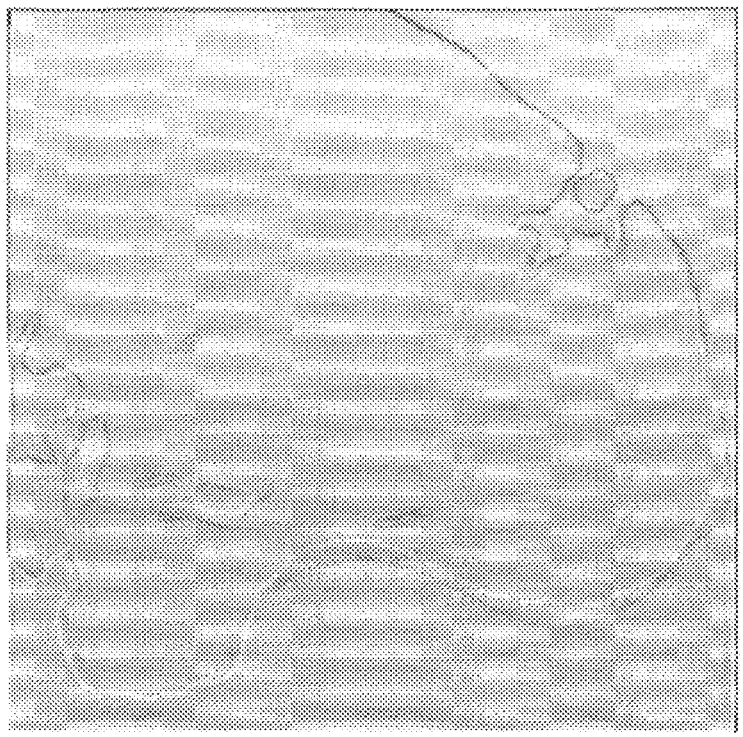
FIG. 15d is the photographic superimposition of FIG. 15b5 (original prediction of the tumor) on the FIG. 15a1 (real situation 1 year before), FIG. 15a1 (in Black: Tumor one year before) and FIG. 15b6 (in White: possible past of the tumor reconstructed one year later) being manually superimposed without adjusting and stretching attempts. Therefore the non perfect correspondence is due to the different format of images taken in two different occasions
Figure 15C:
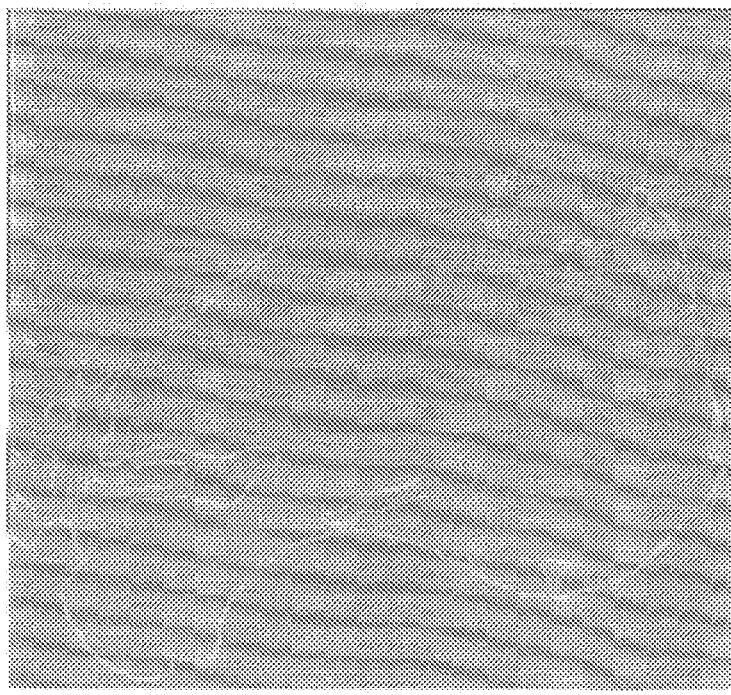
FIG. 15c is a superimposition of FIGS. 15a1: Time 0–present–α=0.0 and of FIG. 15a5: Time 0–possible future– α=0.4 and wherein FIG. 15b1 (in Black the real Tumor 1 year later) and FIG. 15a5 (in White Tumor predicted one year before) have been manually superimposed without adjusting and stretching attempts. Therefore the non perfect correspondence is due to the different format of images taken in two different occasions.

The transformation of the breast tumor shape at time 0 in the processing with α=0.0 (present time) and with α=0.4 (possible future) is clear:

The photographic superimposition of FIG. 15*a*5 (prediction of the tumor development) on FIG. 15*b*1 (real situation one year later) shows that the method according to the present invention is able to find the hidden development model of the tumor such as shown in FIGS. 15*c*.

Figure 16B:
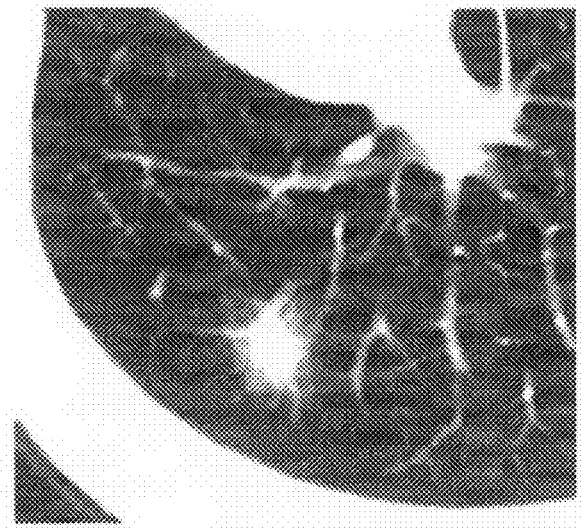
FIGS. 16a and 16b are a glandular cancer of the B type in a 64-year-old man the initial CT scan showing a small solid nodule (arrow) with a minimal glassy opacity of the adjacent background (15×10 mm) in the right median lobe, and the same carcinoma for which a CT scan 1137 has been obtained after the initial CT scan and which shows an increased size (25×20 mm) and a vascular convergence and wherein the solid attenuation area is also increased respectively.
Figure 16A:
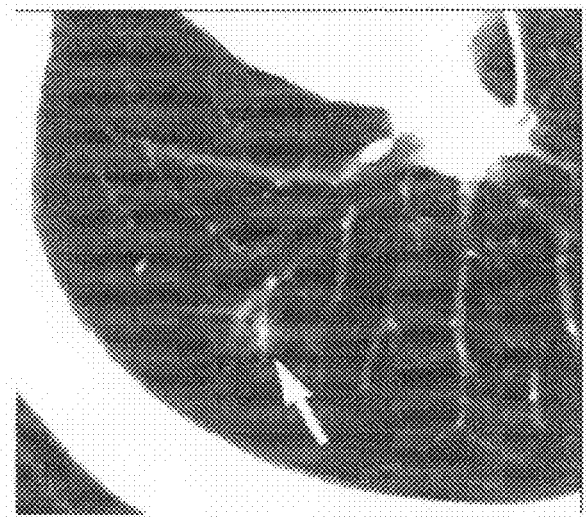
Figure 16D:
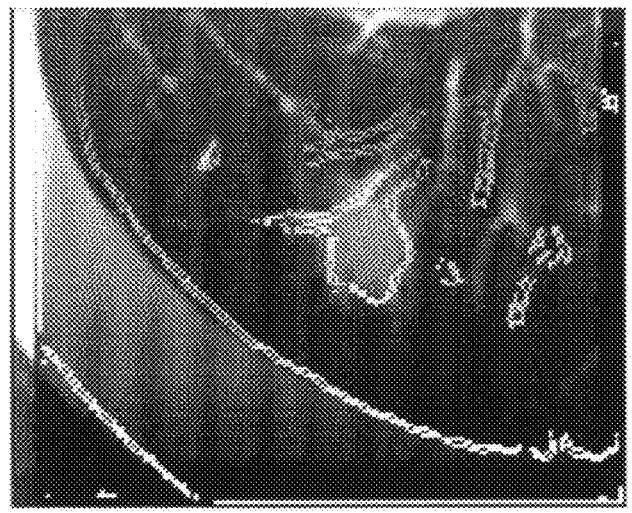
FIG. 16d is the superimposition of FIGS. 16b and 16a.6 as a predicition of the tumor shape with α=0.5 by means of the method according to the present invention.
Figure 16C:
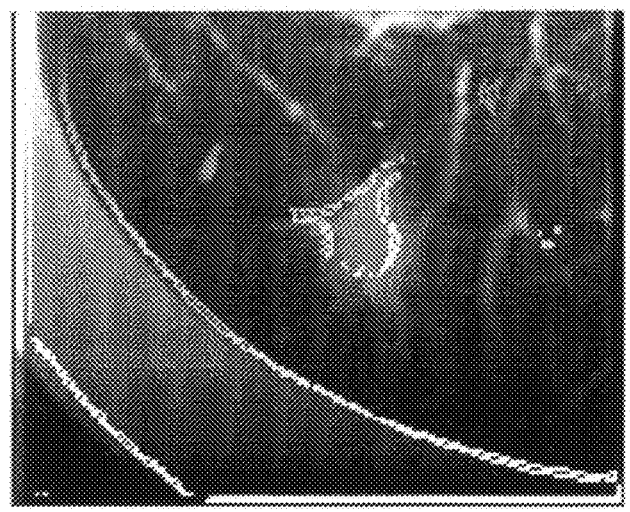
FIG. 16c is the superimposition of FIGS. 16b and 16a.5 as a prediction of the tumor shape with α=0.4 by means of the method according to the present invention.

Similarly the transformation of the tumor shape at time 1 in the processing with α=0.0 (present time) and with α=−0.4 (possible past) is also clear. As it results from FIG. 15*d*, the photographic superimposition of FIG. 15*b*5 (original prediction of tumor) on FIG. 15*a*1 (real situation 1 year before) shows that the present method is able to find also in this case the hidden generation model of the tumor:

The same procedure has been repeated with the second pair of images of FIGS. 16*a* and 16*b*. The latter have been taken from the same patient at a distance of about 3 years. In this case it was a different type of tumor.

Such as shown in the sequence of images of FIGS. 16*a*1 to 16*a*6 of FIG. 16 the present method processed the image at time 0 (FIG. 16*a*) with different kind of positive values of α:

The processing of the tumor shape in FIGS. 16*a*5 and 16*a*6 seems a good prediction of the development of the tumor 3 years later.

The fact of superimposing the real tumor shape at time 1 (3 years later) on the two predictions of the method according to the present invention with two independent parameters of α on the scanned image 3 years before (see below) confirms the specific ability of the system in isolating and pointing out informative models provided in the starting image with brightness levels that are so thin and specific to result as noise variations for other algorithms and to be not apparent by human eye.

From above tests it is clear that the method according to the present invention is able to read in the image at Time 0 brightness variations that are hardly to be seen. These thin brightness variations seem to outline the tumoral development plan that will be achieved at time 1.

The method according to the present invention provides the dynamic evolution both of local connection values, and of state value of each unit. Regarding such complex evolution dynamics the image intended to be changed is a suitable scaling, at each cycle, of the average of values of all local connections about each pixel-unit.

From the above it is clear that the most important characteristics of the method are the following ones:

a. in each image the method isolates closed figures and background in few cycles on the base of a specific brightness intensity (factor α).

b. with the factor α changing, the method selects different figures and background as if it read the brightness intensity as "different type of frequencies".

c. at the end of the evolution the method has filled figures or the background (depending on which part is the most bright) with waves, propagating from isolated figures. The shape of each wave will be homologous to the figure shape acting as its source. Destroying and constructive interferences among these waves outline the skeleton of figures.

d. The evolution of the method with different values of parameter α scans different portions of the same image, provided with a different brightness. In the case of lung tumors detected by CT the method seems able to read the past and future history of the tumor from various bright traces left by it and from the ones revealing its development project. This is due to the fact that the method is able to isolate, almost geologically, different brightness layers in the same image; layers that are not apparent by human eye and by other mathematical imaging systems.

These characteristics of the method according to the present invention are due to some of its mathematic characteristics:

The method architecture, providing the independent evolution both of its local connections and of its units in space and time.

The algorithm aiming at projecting each image from pixels to the grid of local connections among pixels. The user, during the system evolution, does not see the evolution of image pixel-units, but he sees the weight value locally connecting each pixel to its first neighbors.

Equations aiming at creating attractions between different pixels and repulsions between similar pixels (from Eq 1 to Eq 4), aid in making closed figures inside the image.

Equations changing the inner state of each unit consider delta 3° order between each pixel and neighborhoods of the neighborhood of its neighborhood (from Eq 5 to Eq 14). Such cascade propagation helps the system in spontaneously closing figures that it has found and in generating waves that are homothetic with respect to the source figure.

The initial scaling parameter α of the image (Eq 0) allows different "brightness intensity frequencies" to be isolated that are so thin that are considered merely a noise or cannot be seen. Starting from a suitably defined parameter α the method according to the present invention, by means of its equations, is able to isolate only bright signals, even if faint ones, tending to make a closed shape, regularizing them; while the ones outside any closed figure, only at such brightness level, are spontaneously removed.

The invention claimed is:

1. An image processing method, wherein each image is composed of an array of image points that are pixels or voxels, each image point being univocally defined by its position within the array of image points and by one or more numerical parameters defining image point appearance, the method comprising:

causing each image point to operate as a node of an artificial neural network, the image being processed as a function of parameters defining an appearance of each image point as values of the nodes of said artificial neural network and as a function of connections of each image point under processing with neighboring image points composed of image points of a predetermined subset of image points comprised within an image point window; and obtaining image points of the new image by iterative evolution steps of parameters defining the appearance, by iterative evolution steps of values of the set of connections, or by a combination of said evolutions, wherein the processing occurs by one or more evolution iterative steps, and wherein each step is a function also of connections of neighboring image points with the image point under examination, when each of said neighboring image points of the image point under examination is considered also as a neighboring image point of one or more or all image points adjacent to said neighboring image point, which function is an immediate feedback contribution for determining appearance values of all other image points, thereby causing the appearance values of each image point of the image to contribute to the determination of new appearance values of all the other image points of a new image resulting from the iterative step, further comprising one or more equations evolving one or more of image points or a connection matrix of said image points considering not only values of neighboring image points and their connections with a central image point, but also subsequent order relationships deriving when each of said neighboring image point is considered as a neighboring image point of each adjacent image point, and when each adjacent image point is considered as the central image point and provides the iteration of said one or more equations at each processing cycle, causing each image point to give its own contribution to each image point distant therefrom through neighboring image points that propagate such contribution.

2. An image processing method, wherein each image is composed of an array of image points that are pixels or voxels, each image point being univocally defined by its position within the array of image points and by one or more numerical parameters defining image point appearance, the method comprising:

causing each image point to operate as a node of an artificial neural network, the image being processed as a function of parameters defining an appearance of each image point as values of the nodes of said artificial neural network and as a function of connections of each image point under processing with neighboring image points composed of image points of a predetermined subset of image points comprised within an image point window; and obtaining image points of the new image by iterative evolution steps of parameters defining the appearance, by iterative evolution steps of values of the set of connections, or by a combination of said evolutions, wherein the processing occurs by one or more evolution iterative steps, and wherein each step is a function also of connections of neighboring image points with the image point under examination, when each of said neighboring image points of the image point under examination is considered also as a neighboring image point of one or more or all image points adjacent to said neighboring image point, which function is an immediate feedback contribution for determining appearance values of all other image points, thereby causing the appearance values of each image point of the image to contribute to the determination of new appearance values of all the other image points of a new image resulting from the iterative step, further comprising one or more processing steps determining an evolution of the value of connections of each image point of the given image in combination with processing steps determining the evolution of the value of the inner state of each image point of the given image.

3. The method according to claim 2, wherein the processing steps determining an evolution of the value of connections of each image point of the given image comprise the following equations where the following definitions are valid:

$W^{i,j[0]}=0.0$: initial value of the connection between any two pixels;

$u_i \in [-1+\alpha, 1+\alpha]$: initial scaling of the value of all pixels of the given image;

$\alpha$=scaling threshold of pixel values;

$x^{[n]}=x$ at n step; any variable (connection, pixel, etc.) at a certain processing cycle;

$P_i^{[n]}$=i-th Pixel at n step;

$Out_i^{[n]}$=i-th Output at n step;

$S_i^{[n]}$=i-th State at n step;

N=neighboring nodes, and wherein the set of equations regulating the value of connections of each pixel is dividable in four steps defined by four equations:

$$D_i = \sum_j^N (u_j^{[n]} - W_{i,j}^{[n]}), \qquad (Eq\ 1)$$

where the factor $D_i$ is a sum of differences between the value of each image point, and the weight with which the central image point is connected thereto, $$J_i = \frac{e^{D_i} - e^{-D_i}}{e^{D_i} + e^{-D_i}}, \qquad (Eq\ 2)$$

where the variable $J_i$ is the result of the application of the hyperbolic tangent function to the factor $D_i$ for determining the following effects:

enclosing possible values of $D_i$ in a finite interval, providing a smooth sigmoid shape to possible values of $D_i$, and working with a function differentiable in each point, $$\Delta W_{i,j}^{[n]} = -(u_i^{[n]} \cdot J_i) \cdot (-2 \cdot J_i) \cdot (1-J_i^2) \cdot (u_j^{[n]} - W_{i,j}^{[n]}), \qquad (Eq\ 3)$$

comprising three components that are the following:

a. a first component, $-(u_i^{[n]} \cdot J_i)$, weighting the value of the central image point with the variable depending on its neighborhood (weights and pixels), while reversing a classical mathematic relation among signs, including a concordance that produces a negative value and a discordance produces a positive value;

b. a second component, $(-2 \cdot J_i) \cdot (1-J_i^2)$, being a second derivative of $J_i$ analyzing how a variation between neighboring image points and weights with which the central image point is connected thereto changes; and c. a third component weighing the entire equation by the difference between each neighboring image point and the weight with which the central image point is connected thereto, $$W_{i,j}^{[n+1]} = W_{i,j}^{[n]} + \Delta W_{i,j}^{[n]}, \qquad (Eq\ 4)$$

where weights connecting the central image point to each image point of its neighborhood are updated.

4. The method according to claim 3, wherein the first component, $-(u_i^{[n]} \cdot J_i)$, weighting the value of the central image point with the variable $J_i$ depending on its neighborhood (weights and pixels), while reversing the classical mathematic relation among signs, operates the following functions on image points:
   a. if the central image point tends towards black (negative value) and weights connecting the central image point to its neighborhood on average are greater than image points of such neighborhood, the value of such portion of the equation will be negative;
   b. if the central image point tends towards black (negative value) and weights connecting the central image point to its neighborhood are on average smaller than image points or pixels of such neighborhood, the value of such portion of the equation will be positive;
   c. if the central image point tends towards white (positive value) and weights connecting the central image point to its neighborhood are on average greater than image points or pixels of such neighborhood, the value of such portion of the equation will be positive; and
   d. if the central image point tends towards white (positive value) and weights connecting the central image point to its neighborhood are on average smaller than image points or pixels of such neighborhood, the value of such portion of the equation will be negative.

5. The method according to claim 3, further comprising steps computing at each evolution cycle an average of output weight values of each central image point and suitably scaling such value between 0 and 255, thereby achieving transformations dividing the image in two parts respectively made of figure and background.

6. The method according to claim 5, wherein the scaling takes place according to the following equations:

$$P_i^{[n]} = Scale_{Pixel} \cdot \frac{\sum_j^N W_{i,j}^{[n]}}{N} + Offset_{Pixel}; \quad (Eq\ 5)$$

$$P_i^{[n]} \in [0, MaxPixelOut];$$

$$Scale_{Pixel} = \frac{MaxPixelOut}{(MaxW - MinW)}; \quad (Eq\ 6)$$

$$Offset_{Pixel} = -\frac{MinW \cdot MaxPixelOut}{MaxW - MinW}.$$

7. The method according to claim 6, wherein the method provides different values of the value $\alpha$ at the initial scaling such to change figure edges with respect to the background.

8. The method according to claim 6, wherein the set of processing steps determining the evolution of the value of the inner state of each image point of the given image comprises the following equations, wherein the following definitions are valid:
   $W_{i,j}^{[0]} = 0.0$: initial value of the connection between any two image points;
   $u_i \in [-1+\alpha, 1+\alpha]$: initial scaling of the value of all pixels of the given image;
   $\alpha$ = scaling threshold of image point values;
   $x^{[n]} = x$ at n step; any variable at a certain processing cycle;
   $P_i^{[n]}$ = i-th image point at n step;
   $Out_i^{[n]}$ = i-th Output at n step;
   $S_i^{[n]}$ = i-th State at n step;
   N = neighboring nodes, and wherein:

$$Out_i^{[n]} = Scale_{Out} \cdot \frac{\sum_j^N W_{i,j}^{[n]}}{N} + Offset_{Out}; \quad (Eq\ 7)$$

$$Out_i^{[n]} \in [-1, +1];$$

$$Scale_{Out} = \frac{2}{MaxW - MinW}; \quad Offset_{Out} = -\frac{MaxW + MinW}{MaxW - MinW} \quad (Eq\ 8)$$

by which steps are carried out scaling the average of the value of connections of each central image point with its neighborhood in a numerical set in the interval $\{-1, +1\}$ and the result of such scaling, taken as its absolute value, defines the inner activation state of each central image point:

$$S_i^{[n]} = |Out_i^{[n]}|; \quad (Eq\ 9)$$

a further equation giving to each image point or pixel a delta factor $\Delta S_{i,j}^{[n]}$, wherein its activation value and the activation value of each image point of which the image point is the neighborhood is:

$$\Delta S_{i,j}^{[n]} = -TanH(S_i^{[n]} + u_j^{[n]}) = -\frac{e^{(S_i^{[n]} + u_j^{[n]})} - e^{-(S_i^{[n]} + u_j^{[n]})}}{e^{(S_i^{[n]} + u_j^{[n]})} + e^{-(S_i^{[n]} + u_j^{[n]})}}; \quad (Eq\ 10)$$

the square sum of 1 complements of $\Delta S^{[n]}_{i,j}$ of each neighborhood of each neighboring image point, suitably weighted, defining the second order value $\phi_i^{[n]}$ of each image point of the image according to the following equation:

$$\varphi_i^{[n]} = LCoef \cdot u_i^{[n]} \cdot \sum_j^N (1 - \Delta S_{j,i}^{[n]})^2; \quad (Eq\ 11)$$

a further equation being provided taking in consideration a function of the sum of $\phi_j^{[n]}$ composing the neighborhood of each image point, and so, taking into consideration third order variations of each image point according to:

$$\psi_i^{[n]} = \sum_j^N TanH(\varphi_j^{[n]}) = \sum_j^N \frac{e^{\varphi_j^{[n]}} - e^{-\varphi_j^{[n]}}}{e^{\varphi_j^{[n]}} + e^{-\varphi_j^{[n]}}}; \quad (Eq\ 12)$$

the vector $\phi_i^{[n]}$ defining the closed edge of the given image, the vector $\psi_i^{[n]}$ being responsible for the progressive generation of edge waves moving from the initial edge to the brightest portion of the image, defining a skeleton of the image by their constructive and destroying interferences, and a further equation being provided considering the intersection between second and third order contributions suitable for defining the final variation that each image unit will receive:

$$\delta u_i^{[n]} = \phi_i^{[n]} \cdot \psi_i^{[n]}; \quad (Eq\ 13)$$

such that the final equation modifying the activation of each image unit at the subsequent cycle will be as follows:

$$u_i^{[n+1]} = u_i^{[n]} + \delta u_i^{[n]}. \quad (Eq\ 14)$$

9. The method according to claim 1, wherein the rule for stopping iterative steps of the method is related to the stabilization of connection value according to equation (3):

$$\Delta W_{i,j}^{[n]} = -(u_i^{[n]} \cdot J_i) \cdot (-2 \cdot J_i) \cdot (1 - J_i^2) \cdot (u_j^{[n]} - W_{i,j}^{[n]}). \quad \text{(Eq 3)}$$

10. The method according to claim 1, wherein the rule for stopping iterative steps of the method is the minimization of the energy of the set of equations, and is given by summing changes of connection values of the entire image at each processing cycle, according to the following equation:

$$E^{[n]} = \sum_{x=1}^{X} \sum_{s=1}^{N} (\Delta w_{x,x_s}^{[n]})^2; \quad \text{(Eq 15a)}$$

where:
X=cardinality of image point of the given image;
N=neighborhood with unit radius of each image point;
$X, x_S$=x-th image point and its neighborhood,
the system evolution causing the system energy to decrease as processing cycles increase according to the following equation:

$$\lim_{n \to \infty} E^{[n]} = 0. \quad \text{(Eq 15b)}$$

11. The method according to claim 1, wherein the method provides a processing of diagnostic images.

12. The method according to claim 11, wherein the method predicts the time development of characteristics of predetermined types of tissue.

\* \* \* \* \*